(12) United States Patent
Joehren

(10) Patent No.: US 9,077,390 B1
(45) Date of Patent: Jul. 7, 2015

(54) WIRELESS CHARGING AND COMMUNICATION

(71) Applicant: NXP B.V., Eindhoven (NL)

(72) Inventor: Michael Joehren, San Jose, CA (US)

(73) Assignee: NXP B.V., Eindhoven (NL)

( * ) Notice: Subject to any disclaimer, the term of this patent is extended or adjusted under 35 U.S.C. 154(b) by 22 days.

(21) Appl. No.: 14/133,250

(22) Filed: Dec. 18, 2013

(51) Int. Cl.
*H02J 7/00* (2006.01)
*H04B 5/00* (2006.01)
*H01M 10/46* (2006.01)

(52) U.S. Cl.
CPC .................................... *H04B 5/0037* (2013.01)

(58) Field of Classification Search
CPC ........ B60L 11/182; H02J 7/025; H01F 38/14; Y02J 90/122
USPC .................................... 455/572, 573; 320/108
See application file for complete search history.

(56) References Cited

U.S. PATENT DOCUMENTS

| | | | |
|---|---|---|---|
| 7,375,492 B2 * | 5/2008 | Calhoon et al. | ............... 320/108 |
| 2012/0005497 A1 | 1/2012 | Tsukamoto et al. | |
| 2012/0046015 A1 | 2/2012 | Little | |
| 2013/0122890 A1 * | 5/2013 | Ito et al. | ...................... 455/422.1 |
| 2013/0324038 A1 | 12/2013 | Kajihara et al. | |
| 2013/0326495 A1 | 12/2013 | Reunamaki et al. | |
| 2014/0208131 A1 | 7/2014 | Kano | |

FOREIGN PATENT DOCUMENTS

| | | |
|---|---|---|
| EP | 2 058 975 A1 | 5/2009 |
| EP | 2 348 405 A1 | 7/2011 |
| EP | 2 605 564 A1 | 6/2013 |
| EP | 2621100 A1 | 7/2013 |
| WO | 2012122648 A1 | 9/2012 |
| WO | 2013/027379 A1 | 2/2013 |
| WO | 2013093922 A2 | 6/2013 |

OTHER PUBLICATIONS

Extended European Search Report for EP Patent Appln. No. 14197538.3 (Apr. 29, 2015).

* cited by examiner

*Primary Examiner* — Lee Nguyen

(57) ABSTRACT

Wireless power and data transfer can be implemented for powering and communicating with a variety of devices, in a manner that facilitates device access under such wireless power conditions. As consistent with one or more embodiments, wireless power and data are communicated in an apparatus such as a mobile device having a power circuit (e.g., a battery) that powers a processor under normal operating conditions, and that also operates in a low-power state (e.g., in which the processor is not operating and/or not operating using the power circuit). Power is generated using wireless power signals and used to power the power circuit and to both extract and store data from wireless data signals. With this approach, data can be transferred in a low-power state, and the processor can use the stored data upon transitioning to an on state in which the processor is active and powered by the power circuit/battery.

20 Claims, 3 Drawing Sheets

WIRELESS CHARGING AND COMMUNICATION

Aspects of various embodiments are directed wireless charging and communication.

Communicating data such as program data to various devices is important for a variety of uses. For instance, portable devices such as mobile telephones and other hand-held devices are often programmed with data that facilitates operation of the device, such as by programming or updating firmware, programming operational data that facilitates recovery of the device from a failure condition, or authorizing the device for use (e.g., authorizing a mobile telephone for access to a wireless network and use by a particular user).

Generally, programming such a device is carried out using a physical connection, such as a USB (universal serial bus) port or wireless interfaces such as Bluetooth, Wi-Fi or other wireless data communicating interfaces such as those employing one or more of GSM (global system for mobile communications), (W)CDMA (wideband code division multiple access), UMTS (Universal Mobile Telecommunication System), and LTE (long term evolution). While such approaches to programming have been implemented for a variety of applications, the applications can be limited. For instance, such devices often have to be powered by a battery or through an external power supply, and may require programming functions to be available or accessible, in order to read or write data to and from the device. Further, certain memory is not accessible without a related operating system (OS) being active.

These and other matters have presented challenges to device programming and operation for a variety of applications.

Various example embodiments are directed to wireless charging and communication circuits and their implementation.

According to an example embodiment, wireless power is used to communicate data with an apparatus having a power circuit, a processing circuit, a wireless communication circuit and a memory access circuit. The processing circuit operates in on and low-power states in which the processing circuit is respectively powered by the power circuit and consumes less power than in the on state (e.g., in which a processor is not running an OS and/or powered internally). The wireless communication circuit receives wireless power signals from a remote device, generates power via the wireless signals, and provides the generated power to the power circuit. The wireless communication circuit also receives wireless data signals from the remote device, and extracts data from the wireless data signals by demodulating the wireless data signals using the generated power. The memory access circuit stores the extracted data in memory (e.g., a memory-storage circuit), using the generated power, while the processing circuit is in the low-power state. While the processing circuit is transitioning from the low-power state to the on state (and/or to another high- or full-power state), the processing circuit is also configured to access the memory, including the extracted data, using power provided by the power circuit.

Such approaches may be used, for example, to access memory within a device while the device is not powered using a main power supply, such as to program a new device for use or for recovery when a device is inoperable. Moreover, data can be recovered from the device without necessarily operating the device under normal conditions (e.g., in which an OS is executed by a microprocessor), which can prevent data loss and provide for error analysis.

Another example embodiment is directed to an apparatus for use in a device having a battery and a processing circuit, with the device being operable in an on state in which the processing circuit is powered by the battery and being operable in an off state in which the processing circuit is not powered by the battery. The apparatus includes a wireless communication circuit that receives inductive power from an inductive power source and, while the device is in the off state, uses the received inductive power to charge the battery and to extract data from wireless data signals. The apparatus also includes a memory access circuit that uses the generated power, while the processing circuit is in the off state, to store the extracted data in memory. In some embodiments, the wireless communication circuit extracts data embedded in electromagnetic waves that provide the inductive power. In further embodiments, the apparatus also includes the processing circuit, which accesses the stored extracted data using power provided by the battery in response to transitioning from the off state to the on state. For instance, the processing circuit may operate in the on state by executing OS instructions having been stored in the memory by the memory access circuit as updated OS instructions (while the processing circuit is in the off state). Such updated OS instructions can thus configure the apparatus to operate while/upon transitioning the processing circuit into the on state (e.g., after a system failure).

Other embodiments are directed to methods used in an apparatus having a power circuit, such as a battery, and a processing circuit that operates in an on state in which the processing circuit is powered by the power circuit, and that operates in a low-power state in which the processing circuit consumes less power than in the on state. Power is generated via wireless power signals received from a remote device, and the generated power is provided to the power circuit. Using the generated power, data is extracted from wireless data signals received from the remote device by demodulating the wireless data signals. While the processing circuit is in the low-power state, the generated power is used to store the extracted data in memory, which is accessible to the processing circuit via power provided by the power circuit. This accessibility is provided not only while the processing circuit is in the low-power state, but also in response to an indication (e.g., an internal flag signal) of transitioning from the low-power state to the on state and thus, during and after transitions from the low-power state to another (more power-consuming) state such as the on state.

In some implementations data indicating an error condition of the processor is accessed from the memory and wirelessly transmitted while the processing circuit is in the low-power state and prior to receiving and storing the extracted data in memory, such that the error condition can be evaluated (e.g., locally or remotely) and used to configure the extracted data for addressing the error condition. As such, the extracted data is stored and used to correct the error condition by configuring the apparatus to operate using the updated OS instructions upon transitioning into the on state.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
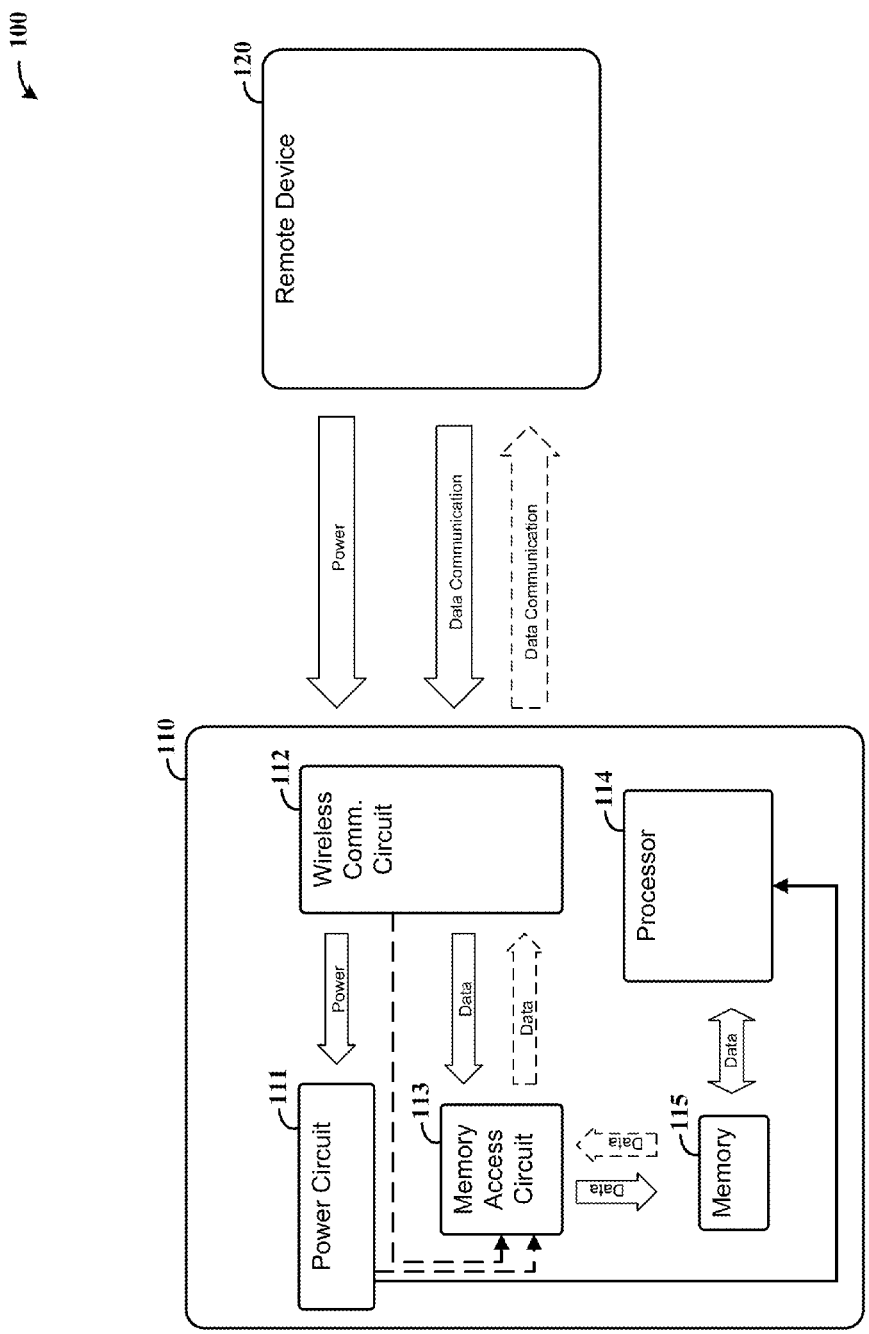
FIG. 1 shows an apparatus and system involving wireless power and data transfer, in accordance with an example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving the communication of wireless power and data. While not necessarily so limited, various aspects may be appreciated through a discussion of examples using this context.

Various example embodiments are directed to methods and/or apparatuses for powering a device via a wireless power signal in a low-power state, and operating the device via the wireless power signal to extract and store data from wireless data signals. In a higher-power or on state, the device operates using power from a power circuit (e.g., a battery), by accessing the stored data. Using this approach, dual-power operation is effected for accessing the memory in a low-power state for storing/updating data, and later accessing the data in a higher-power/on state, which can be implemented for a variety of approaches. Further, these aspects can be implemented in situations in which a device's main power supply (e.g., battery) is unavailable. For instance, it can be helpful to read memory content without the OS being active for failure analysis and software forensics.

In various embodiments, the wireless power is used to deliver power for activating one or more functions and/or operate devices without the requirements of a (working) battery or main power supply inside the device. Such wireless power transfer may, for example, involve short-range systems that work over the distance of a few to 10 cm to transmit significant amounts of power. One-way or bidirectional data communications can be carried out using a separate signal and/or using available in-band communications embedded with wireless power transfer. In some bidirectional implementations, bidirectional authentication and/or encryption is used to effect programming and data exchange for a variety of applications. These and other data communication approaches may involve, for example, programming a SIM (subscriber identity module) card, updating bios or firmware, low-power memory access, and error troubleshooting.

Various embodiments are directed to operation in low-power and higher-power (ON) modes involving a device having a processor circuit that operates via battery power, and a data-access circuit that operates in the low-power mode in which the processor circuit is not operating (e.g., when the device is not "on") and using wireless power (e.g., without requiring power from the battery). In some implementations, the processor operates in a low-power state by operating in an idle state in which the processing circuit is powered at a lower power than in an on state. Such a low-power mode may be implemented, for example, using near field communications (NFC) and wireless power to operate the data-access circuit, which facilitates configuration and/or reconfiguration of the device for a variety of applications. For instance, data pertaining to bios, firmware or an OS for the processor/device can be communicated and stored in the low-power state, and used upon subsequent power-up of the device. Similarly, data can be written for storing device-specific data such as may pertain to a SIM card, without booting the device (e.g., to store data for and/or program a SIM card in a retail store and/or during manufacturing without operating the device. Data can also be accessed for reading out information such as error codes or data recovery, without necessarily operating the device (e.g., while a microcontroller in the device is not powered).

A variety of wireless power transfer approaches may be implemented to suit particular embodiments. For example, inductive power, or resonant inductive power, can be used to transfer power to an apparatus as described herein. In some embodiments, power transfer is effected using one or more standards for electromagnetic induction and/or magnetic resonant inductive power (e.g., a Qi standard as provided by the Wireless Power Consortium of Piscataway, N.J.; a PMA standard as provided by Power Matters Alliance of Houston, Tex.; and a A4WP standard as provided by Alliance For Wireless Power of Fremont, Calif. Further, different types of power and data communication may be implemented together (e.g., inductive power transfer with NFC data transfer). These and other approaches may, for example, be implemented with a variety of types of devices and applications, such as for medical devices, gaming devices and portable electronics such as mobile phones, tablets and laptops. In certain embodiments, such devices are implemented with no physical connector (e.g., sealed), such that both battery charging and data communications with circuitry within the devices is via wireless communication.

A variety of types of data communications are effected via wireless power and communication as described herein. For instance, data can be written as firmware for one or more of microprocessors with firmware, flash memory, SIM cards, and secure elements as may be implemented for a variety of devices. Other software can be written, such as for updates or altering settings such as subscriber identify information (e.g., for SIM cards). Further, these approaches can be implemented with distance-limited communications (e.g., NFC of 10 cm or less), facilitating security relative to, for example, longer-range transmissions as with Bluetooth, Wi-Fi or cellular-type communications.

A variety of communication mediums can be used for effecting data transfer. For instance, certain communications may be effected via standards such as Bluetooth, NFC or Wi-Fi. Bidirectional communications can be implemented as part of a wireless charging signal, which can be used as an alternative to, or in addition to other communications, such as where such other communications are unavailable (e.g., due to fault or system capabilities). In some embodiments, data is communicated via the wireless charging signal by embedded data into an existing communication frame structure between a power transmitter and a power receiver. Such an approach may be implemented in which the wireless power signals are inductive signals, and wireless data signals are embedded within the wireless power signals and demodulated therefrom. In other embodiments, data is communicated via the wireless charging signal via an extended or altered communication protocol that facilitates the communication of specific frames for data transmission (e.g., which may be communicated separately from the wireless power signals). Additional safety measures such as encryption and authentication can be implemented with these communications.

In addition, various communications may be implemented in conjunction with wired communications such as via a USB port. By using wireless charging/power to access memory (read and/or write access), additional power is not necessarily required from an internal battery or other source, which can also be useful when a battery or other power source (e.g., a power management unit [PMU]) fails.

In some embodiments, wireless power transfer as described herein is used to operate a processor within a device directly, as an alternate to a main power supply. Such an implementation may, for example, involve providing inductive power to operate a microprocessor within a mobile device that otherwise uses a battery as a main power supply, in situations in which the battery is inoperable and/or otherwise not used for power. Such approaches may, for example, involving booting an application processor of a mobile device.

The following describes a particular embodiment in which an apparatus operates to communicate wireless power and data such as described herein, and includes a power circuit, a processing circuit, a wireless communication circuit and a memory access circuit. The power circuit may, for example, correspond to a main power supply as may be provided via a battery within a mobile device, with the processing circuit including a microprocessor that executes an OS within the device when powered by the main power supply. As such, the processing circuit operates in an on state in which the processing circuit is powered by the power circuit, and in a low-power state in which less power is consumed. Such a low-power state may involve, for example, one or more of: a state in which an OS is not executed, a state in which the power circuit does not power the processor, or a state in which the processor is inactive.

The wireless communication circuit receives wireless power and data signals from a remote device, generates power via the wireless signals, provides the generated power to the power circuit, and extracts data from the wireless data signals (e.g., by demodulation) using the generated power. The memory access circuit stores the extracted data in memory using the generated power. As such, when the processing circuit (or the apparatus as a whole) returns to an on state and/or another high-power state, the processing circuit can access and use the stored extracted data (e.g., such as effecting an update to the OS or other data).

The memory access circuit may be implemented using one or more of a variety of approaches and related circuitry. Such a memory access circuit may, for example, be implemented using a logic circuit that controls read and/or write access to memory, a memory controller, a memory mapping circuit or a combination thereof. For instance, such a circuit may be implemented to read or write flash memory, RAM or other types of memory, and to facilitate the outputting of such read data.

In some embodiments, the power circuit includes a battery that is charged using the power generated via the wireless signals, such as via inductive coupling. The processing circuit operates in the on state by executing OS instructions stored in the memory, using power from the battery. As may be implemented to update the OS and/or correct for corrupt data or other errors, the memory access circuit stores updated OS instructions in the memory while the processing circuit is in the off state. The apparatus can thus be configured to operate using the updated OS instructions upon transitioning the processing circuit into the on state via power provided by the battery. For instance, where the processor is off/not powered in the low-power state, it uses the updated OS instructions upon rebooting. In these and other contexts, transitioning may involve activity, such as collecting energy for a partial or full power-up or reboot of a device, such as for applying power from an energy-storage source or energy-collection device (e.g., capacitive circuit or battery) to the processing circuit.

In some embodiments, the memory access circuit uses generated power to read data from the memory while the processing circuit is in the low-power state, and the wireless communication circuit modulates the data read from the memory and wirelessly communicates the modulated data to the remote device. Such an approach can be useful, for example, for effecting secure communications, such as by extracting encryption data and to encrypt the data read from the memory for wireless communication. Such an approach can also be useful for recovering data or detecting error data when the processing circuit is malfunctioning. For instance, error log data can be read from the memory and transmitted to the remote device in response to an error condition in the apparatus. This can be useful, for example, with devices in which the power circuit includes a battery and the processing circuit executing OS instructions stored in the memory in an on state, using power from the battery. When a boot error occurs, the memory access circuit uses the generated power to read error data indicative of the boot error, transmit the error data to a remote device, and to reconfigure operation of the processing circuit by overwriting data in the memory with data received in response to the error data, while the processing circuit is in the low-power state/not powered by the battery.

As discussed above, data may be accessed using one or more of a variety of types of circuits. In some embodiments, the apparatus includes a secure module including a memory circuit, in which the memory access circuit stores extracted data in memory by storing authentication data in the memory circuit of the secure module. The processing circuit operates with the secure module to provide user-access via the apparatus, based upon the stored authentication data. In some implementations, the processing circuit operates with the secure module to provide user-access by using the stored authentication data to authenticate the apparatus on a wireless telephony network, based upon information in the authentication data corresponding to a subscriber identity.

In another embodiment, an authentication approach is carried out with the apparatus above as follows. The wireless communication circuit and memory access circuit respond to wireless communications from the remote device by accessing and communicating authentication data to the remote device. When a further wireless communication including the data signals and an indication of the authentication data is received from the remote device, the apparatus receives the further wireless communication and stores the extracted data in memory as a function of the authentication.

As various ones of the above-discussed features and aspects can be used together in varying combinations (with and without the features and aspects in the discussion which follows, it will be appreciate that the instant disclosure embraces yet further embodiments incorporating such combinations.

Turning now to the figures, FIG. 1 shows an apparatus and system 100 involving wireless power and data transfer, in accordance with an example embodiment. A device 110 includes a power circuit 111 and a wireless communication circuit 112 that receives wireless power, such as inductive power, and data from a remote device 120 (e.g., via a coil, or antenna). The wireless communication circuit 112 provides received power to the power circuit 111, such as by charging a battery therein. The data may be communicated as part of wireless power transmission and/or as a separate communication.

The device 110 also includes a memory access circuit 113 and a processor 114, each of which access a memory 115. In some implementations, some or all of the memory access circuit 113 is also implemented by the processor 114. The processor 114 is powered by the power circuit 111, and the memory access circuit 113 is powered by one or both of wireless power received via the wireless communication circuit 112 and power from the power circuit.

When wireless power and data are received from the remote device 120, the wireless communication circuit 112 provides the power to operate the memory access circuit 113, and uses the power to demodulate received data. The memory access circuit 113 stores the demodulated data in memory 115, which is subsequently accessed and used by the processor 114. This approach may, for example, be implemented in connection with one or more embodiments as described herein, such as for writing data in the memory 115 while the processor 114 is in an off state/not powered by the power circuit 111.

In a more particular embodiment, the memory access circuit 113 accesses data stored in the memory 115 while the processor 114 (and the device 110 in general) is in an off state, and the wireless communication circuit 112 modulates and transmits the accessed data to the remote device 120. Such an approach may, for example, be used to recover data from memory 115 when the device 110 is not operating, or to access an error code when the device 110 malfunctions.

The memory 115 may, for example, be implemented as part of a secure element or SIM card as discussed herein, or as part of main system memory of the device 110. As such, a variety of types of devices and memory storage approaches may be used in accordance with various embodiments.

Figure 2:
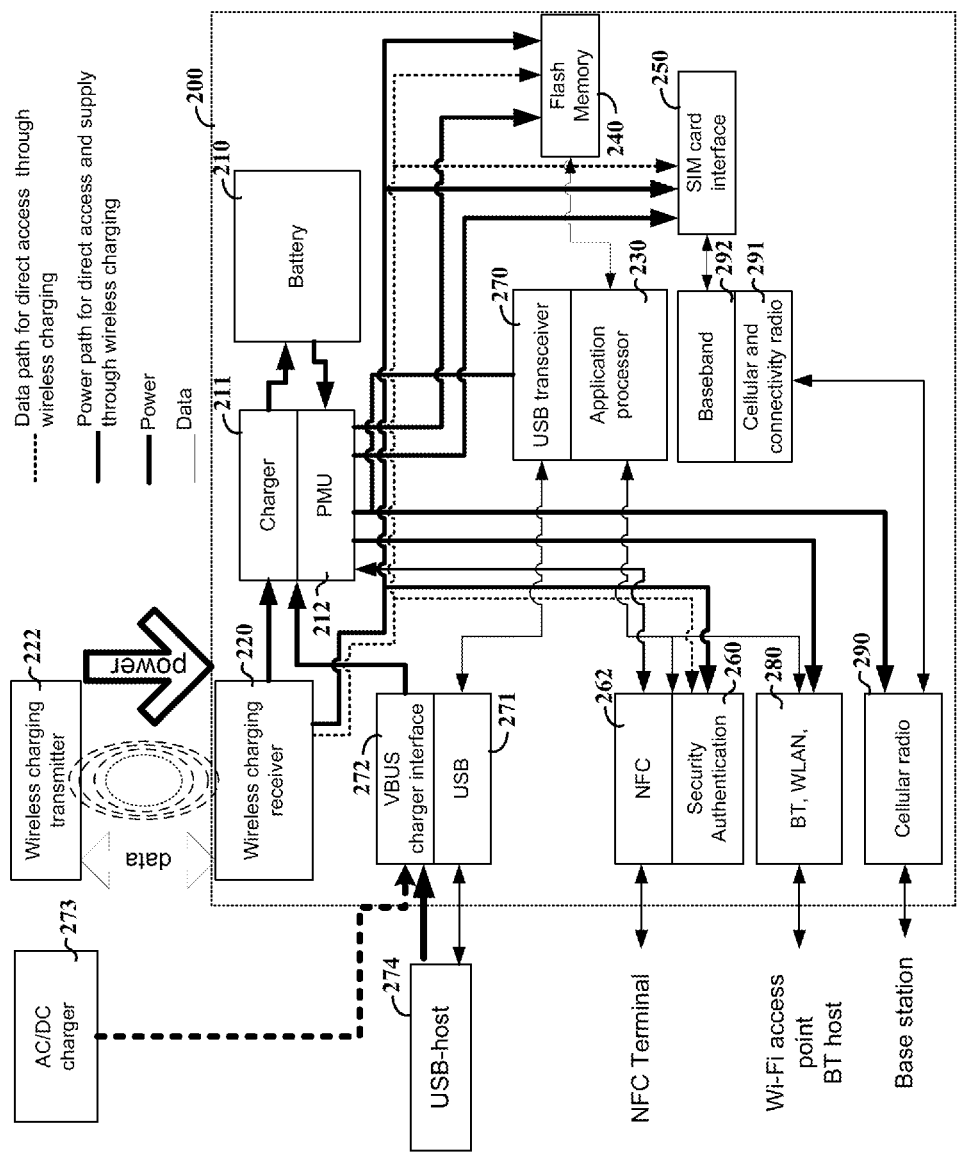
FIG. 2 shows an apparatus involving wireless power and data transfer, in accordance with an example embodiment.

FIG. 2 shows an apparatus 200 involving wireless power and data transfer, in accordance with an example embodiment. The apparatus 200 operates to provide wireless power and data communications under low-power or off-state operation, as may be implemented in accordance with one or more embodiments as described herein. Power lines are shown as thick lines, data lines as thin lines, and a direct access data path used with a low-power mode with wireless charging is shown as a dashed line. The apparatus 200 includes a battery 210, a charging circuit 211 and PMU 212. A wireless charging receiver 220 operates to receive wireless (e.g., inductive) power and data transmitted by a wireless charging transmitter 222, and provides the power to the charging circuit 212 as well as one or more circuits within the apparatus 200. A processor 230 operates the apparatus 200 using power from the battery 210, such as by executing OS data to carry out device functions.

The apparatus 200 operates in a low-power mode to store data received from the wireless charging transmitter 222, in one or more of a variety of memory components. By way of example, the components as shown may include one or more of flash memory 240, a SIM card interface 250, and a secure module 260 with corresponding NFC interface 262. In this regard, the wireless charging receiver 220 also operates as a memory access device to store data in one or more of these components during low-power operation, as may be implemented using embodiments as described herein. For example, when the processor 230 is not powered by the battery 210, the wireless charging receiver 220 may be powered via the wireless charging transmitter 222 and stores received data in one or more of the memory components, with the processor directly or indirectly using the stored data upon power-up. Such an approach can be used to program the SIM card interface 250, to write firmware to the device, or to write security authentication data for NFC use.

The apparatus 200 is also shown by way of example as having a variety of communication circuits, which may be selectively implemented or not implemented, to suit one or more embodiments. These include a USB transceiver 270 along with a USB port 271 and a charger interface 272 that receives power from an AC/DC charger 273 and communicates with a USB host 274, a Bluetooth or WLAN type circuit 280, and a cellular radio circuit 290 that is accompanied by a cellular and connectivity radio 291 and baseband circuit 292.

Consistent with one or more embodiments, one or more multiplexers are used to pass data between memory and either an internal processor or a wireless communication circuit. In some implementations, such multiplexer circuitry is also used to switch a power source, as provided via wireless power or via an internal power source, such as a battery. Such aspects may, for example, be implemented with the wireless charging receiver 220 in FIG. 2 and, in some implementations, a power management unit such as PMU 212.

The multiplexer circuitry may be implemented in a variety of manners. In some embodiments, the multiplexer circuitry is used to clock in data and control signals as operated using power generated via wireless charging receiver 220. Multiplexing for coupling data via the wireless charging receiver 220 and/or an internal processor (such as 230) is carried out based upon data to be passed via the receiver (one-way for control signals to the memory or two-way for data into and out of the memory). This activity occurs in response to power being provided via the wireless charging receiver 220, e.g., and in the absence of power via the battery 210 or a lower power state thereof. As another example, when a voltage is present, relative to power received via wireless charging receiver 220, the voltage may be used to control the multiplexing circuitry for providing data and/or power communications between the wireless charging receiver and one or more circuits within the apparatus 200. A voltage presented by the battery (e.g., achieving a minimum threshold upon power-up) may also be used as an indication for selection to switch control of the multiplexing circuitry. For example, in response to such an indication (from a transistor being activated by the minimum threshold being reached), a select signal is presented to the multiplexer circuitry in accordance with whether the internal processor is in control of the memory accesses.

Figure 3:
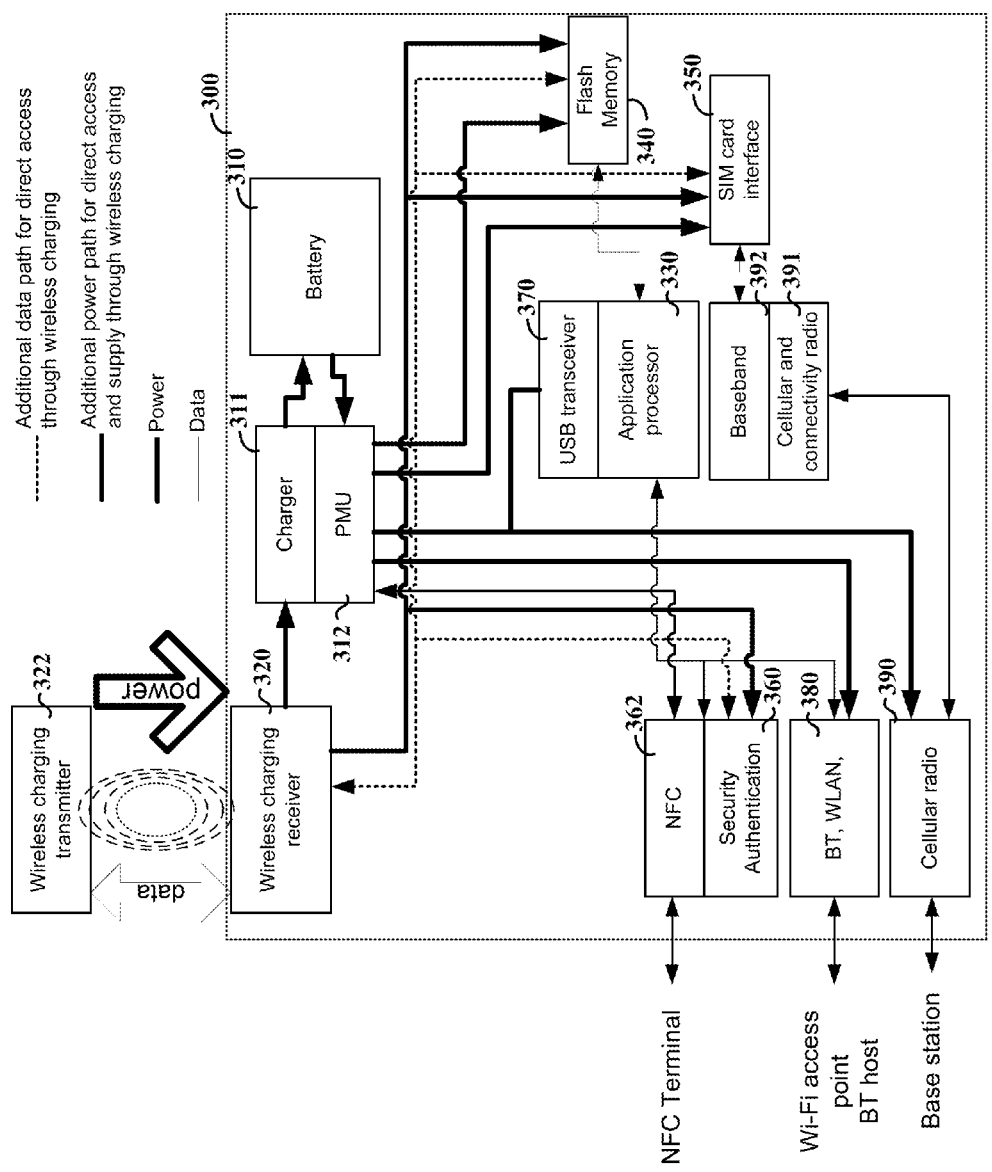
FIG. 3 shows an apparatus involving wireless power and data transfer, in accordance with an example embodiment.

FIG. 3 shows another apparatus 300 involving wireless power and data transfer, in accordance with an example embodiment. The apparatus 300 can be implemented in a manner similar to that as the apparatus 200 shown in FIG. 2, with similar reference numbers used to label similar components, and without physical external connectors (e.g., physical USB ports) as facilitated by wireless charging and data communication.

The apparatus 300 includes a battery 310, a charging circuit 311 and PMU 312. A wireless charging receiver 320 operates to receive wireless power and data transmitted by a wireless charging transmitter 322, and provides the power to the charging circuit 312 as well as one or more circuits within the apparatus. A processor 330 operates the apparatus using power from the battery 310, such as by executing OS data to carry out device functions. Data received from the wireless charging transmitter 322 is stored in one or more memory components including flash memory 340, a SIM card interface 350, and a secure module 360 with corresponding NFC interface 362, such as described above. The apparatus 300 is shown with communication circuits including a USB transceiver 370 (e.g., to receive wireless signals transmitted using a USB protocol), a Bluetooth or WLAN type circuit 380, and a cellular radio circuit 390 that is accompanied by a cellular and connectivity radio 391 and baseband circuit 392.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., receiving data, transmitting data, generating power, accessing memory, or configuring operation). For example, in certain of the above-discussed embodiments, one or more modules are discrete logic circuits or programmable logic circuits configured and arranged for implementing these operations/activities, as in the circuit modules shown in FIGS. 1-3. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit (e.g., a microprocessor or microcomputer) operable when executing a set of instructions in the form of software/firmware, where the first module includes a first CPU hardware circuit with one set of instructions and the second module includes a second CPU hardware circuit with another set of instructions (the skilled artisan will appreciate that the physical implementation of the first and second CPU hardware circuitry can be merged into a single hardware circuit or separated).

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, different types of wireless communications may be carried out, two or more types of communications may be carried out in a single device, and additional power modes may be employed (e.g., a third or more power states corresponding to different levels or power consumption and/or circuit-based features (such as clock speed and activation or enablement of specific circuits) expected to consume such power, and two or more power states corresponding to main/system power such as battery-provided power). Such modifications do not depart from the true spirit and scope of various aspects of the invention, including aspects set forth in the claims.

What is claimed is:

1. An apparatus comprising:
   a power circuit;
   a processing circuit configured and arranged to operate in an on state in which the processing circuit is powered by the power circuit, and to operate in a low-power state in which the processing circuit consumes less power than in the on state;
   a wireless communication circuit configured and arranged to
      receive wireless power signals from a remote device, generate power via the wireless signals, and provide the generated power to the power circuit, and
      receive wireless data signals from the remote device, and extract data from the wireless data signals by demodulating the wireless data signals using the generated power; and
   a memory access circuit configured and arranged with the processing circuit to consume power at different levels relative to the low-power state, wherein while the processing circuit is in the low-power state, the generated power is used to store the extracted data in memory and to communicate wireless data signals to the remote device and, in response to an indication of transitioning from the low-power state to the on state, the stored extracted data is accessed by the processing circuit using power provided by the power circuit.

2. The apparatus of claim 1, wherein
   the power circuit includes a battery configured and arranged to be charged using the power generated via the wireless signals;
   the processing circuit is configured and arranged to operate in the on state by executing operating system instructions stored in the memory, using power from the battery; and
   the memory access circuit is configured and arranged to store the extracted data in the memory by storing updated operating system instructions in the memory while the processing circuit is in the off state and, via the stored updated operating system instructions, configuring the apparatus to operate using the updated operating system instructions upon the indication of transitioning the processing circuit into the on state, via power provided by the battery.

3. The apparatus of claim 2, wherein the processing circuit is configured and arranged to operate in the low-power state by operating in an off state in which the processing circuit does not execute the operating system instructions.

4. The apparatus of claim 1, wherein
   the memory access circuit is configured and arranged to use the generated power to read data from the memory while the processing circuit is in the low-power state, and
   the wireless communication circuit is configured and arranged with the memory access circuit to modulate the data read from the memory and to wirelessly communicate the modulated data to the remote device.

5. The apparatus of claim 4, wherein the memory access circuit is configured and arranged to use the generated power to read the data from the memory by reading error log data from the memory in response to an error condition in the apparatus.

6. The apparatus of claim 4, wherein
   the power circuit includes a battery configured and arranged to be charged using the power generated via the wireless signals;
   the processing circuit is configured and arranged to operate in the on state by executing operating system instructions stored in the memory, using power from the battery; and
   the memory access circuit is configured and arranged to
      in response to a boot error for the processing circuit, use the generated power to read the data from the memory by reading error data indicative of the boot error, wherein the wireless communication circuit modulates and transmits the read data to the remote device, and
      in response to data received from the remote device and corresponding to the error data, reconfigure operation of the processing circuit by using the generated power to overwrite data in the memory with the received data while the processing circuit is in the low-power state.

7. The apparatus of claim 4, wherein the extracted data includes encryption data and wherein the wireless circuit and the memory access circuit are configured and arranged to encrypt the data read from the memory, modulate the encrypted data, and wirelessly communicate the modulated encrypted data to the remote device.

8. The apparatus of claim 1,
further including a secure module including a memory circuit,
wherein the memory access circuit is configured and arranged to store the extracted data in memory by storing authentication data in the memory circuit of the secure module, and
wherein the processing circuit is configured and arranged with the secure module to provide user-access via the apparatus, based upon the stored authentication data.

9. The apparatus of claim 8, wherein the processing circuit is configured and arranged with the secure module to provide the user-access by using the stored authentication data to authenticate the apparatus on a wireless telephony network based upon information in the authentication data corresponding to a subscriber identity.

10. The apparatus of claim 1, wherein the processing circuit operates in the low-power state by operating in an idle state in which the processing circuit is powered at a low-power idle state in which the processing circuit consumes less power than in the on state.

11. The apparatus of claim 1, wherein the wireless power signals are inductive signals, and wherein the wireless circuit is configured and arranged to receive the wireless data signals embedded within the wireless power signals, and to demodulate the wireless data signals from the wireless power signals.

12. The apparatus of claim 1, wherein the wireless communication circuit is configured and arranged to demodulate the wireless data signals by extracting wireless data signals embedded within dedicated data transmission frames within the wireless power signals.

13. The apparatus of claim 1, wherein the wireless communication circuit and memory access circuit are configured and arranged to,
in response to a wireless communication from the remote device, accessing and communicating authentication data to the remote device, and
in response to receiving, from the remote device, a further wireless communication including the data signals and an indication of the authentication data, authenticate the further wireless communication and store the extracted data in memory as a function of the authentication.

14. The apparatus of claim 1, wherein the wireless circuit is configured and arranged to receive the wireless power signals via electromagnetic induction and to receive the wireless data signals via near-field communications involving signals limited in communication distance to less than 10 cm.

15. For use in a device having a battery and a processing circuit, the device being operable in an on state in which the processing circuit is powered by the battery and being operable in an off state in which the processing circuit is not powered by the battery, an apparatus comprising:
a wireless communication circuit configured and arranged to
receive inductive power from an inductive power source, and
while the device is in the off state, use the received inductive power to charge the battery and to extract data from wireless data signals; and a memory access circuit configured and arranged to, while the processing circuit is in the off state, use the generated power to store the extracted data in memory.

16. The apparatus of claim 15, wherein the wireless communication circuit is configured and arranged to extract the data from wireless data signals by extracting data embedded in electromagnetic waves that provide the inductive power.

17. The apparatus of claim 15, further including the processing circuit, wherein the processing circuit is configured and arranged to access the stored extracted data using power provided by the battery in response to transitioning from the off state to the on state.

18. The apparatus of claim 17, wherein
the processing circuit is configured and arranged to operate in the on state by executing operating system instructions stored in the memory, using power from the battery; and
the memory access circuit is configured and arranged to store the extracted data in the memory by storing updated operating system instructions in the memory while the processing circuit is in the off state and, via the stored updated operating system instructions, configure the apparatus to operate using the updated operating system instructions upon transitioning the processing circuit into the on state via power provided by the battery.

19. For use in an apparatus having a power circuit and a processing circuit that operates in an on state in which the processing circuit is powered by the power circuit, and that operates in a low-power state in which the processing circuit consumes less power than in the on state, a method comprising:
generating power via wireless power signals from a remote device;
providing the generated power to the power circuit;
extracting data from wireless data signals received from the remote device by demodulating the wireless data signals using the generated power;
while the processing circuit is in the low-power state, using the generated power to store the extracted data in memory; and
in the processing circuit, accessing the stored extracted data using power provided by the power circuit, in response to transitioning from the low-power state to the on state.

20. The method of claim 19,
wherein the power circuit is a battery,
wherein providing the generated power includes charging the battery,
further including, while the processing circuit is in the low-power state and prior to using the generated power to store the extracted data in memory, accessing data indicating an error condition of the processing circuit from the memory and wirelessly transmitting the data indicating the error condition, and
wherein using the generated power to store the extracted data includes storing updated operating system instructions in the memory while the processing circuit is in the off state, and correcting the error condition by configuring the apparatus to operate using the updated operating system instructions upon transitioning the processing circuit into the on state via power provided by the battery.

* * * * *